United States Patent
Fan et al.

(10) Patent No.: US 8,665,718 B2
(45) Date of Patent: Mar. 4, 2014

(54) METHOD AND DEVICE FOR IMPLEMENTING VIRTUAL-SWITCH

(75) Inventors: Lingyuan Fan, Shenzhen (CN); Yuepeng Chen, Shenzhen (CN); Dengchao Wu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 113 days.

(21) Appl. No.: 13/215,756

(22) Filed: Aug. 23, 2011

(65) Prior Publication Data

US 2011/0305243 A1    Dec. 15, 2011

Related U.S. Application Data

(63) Continuation of application No. 12/014,170, filed on Jan. 15, 2008, now Pat. No. 8,045,461, which is a continuation of application No. PCT/CN2006/001290, filed on Jun. 12, 2006.

(30) Foreign Application Priority Data

Jul. 15, 2005    (CN) .......................... 2005 1 0083968

(51) Int. Cl.
    *H04J 1/16*       (2006.01)

(52) U.S. Cl.
    USPC .................... 370/230.1; 370/235; 370/395.53; 709/220; 709/238

(58) Field of Classification Search
    CPC ............................ H04L 12/465; H04L 12/467
    USPC .............. 370/219, 225, 230.1, 235, 349, 389, 370/395.53, 395.42, 390, 392; 709/220, 709/224, 225, 236, 238, 245, 246
    See application file for complete search history.

(56) References Cited

U.S. PATENT DOCUMENTS 7,369,495 B1 *   5/2008   Lemaire et al. ............. 370/230.1
2003/0123453 A1 *   7/2003   Ooghe et al. ............. 370/395.53

(Continued)

FOREIGN PATENT DOCUMENTS

CN      1486041 A      3/2004
CN      1492634      4/2004

(Continued)

OTHER PUBLICATIONS

Written Opinion of the International Searching Authority and International Preliminary Report on Patentability (translation) dated (mailed) Oct. 19, 2006, issued in related application No. PCT/CN2006/001290, filed Jun. 12, 2006, Huawei Technologies Co., Ltd.

(Continued)

*Primary Examiner* — Hassan Phillips
*Assistant Examiner* — Ajay Cattungal
(74) *Attorney, Agent, or Firm* — Huawei Technologies Co., Ltd

(57) ABSTRACT

The present invention provides a method and a device for implementing a V-Switch. Through setting up a V-Switch correlation with respect to at least two VLAN tags, a DRE performs a V-Switch transmission on an Ethernet frame received according to the V-Switch correlation with respect to at least two VLAN tags. The invention can expand the number of V-Switch connections carried on a local link to 4096×4096, or even to 4096×4096×4096 . . . . Therefore, the problem of insufficient VLAN tag resources is solved, and the requirements for the scale of V-Switch technology is met. Moreover, a more effective V-Switch method is provided, the switching capability of V-Switch is improved, and the application scale of V-Switch technology is enlarged.

14 Claims, 1 Drawing Sheet

(56) References Cited

U.S. PATENT DOCUMENTS

| | | | |
|---|---|---|---|
| 2003/0154279 A1* | 8/2003 | Aziz | 709/225 |
| 2004/0017816 A1* | 1/2004 | Ishwar et al. | 370/395.53 |
| 2004/0095941 A1 | 5/2004 | Natsume et al. | |
| 2005/0063397 A1* | 3/2005 | Wu et al. | 370/401 |
| 2005/0265329 A1* | 12/2005 | Havala et al. | 370/389 |
| 2006/0146697 A1* | 7/2006 | Magret et al. | 370/219 |
| 2006/0221960 A1* | 10/2006 | Borgione | 370/390 |
| 2006/0245439 A1* | 11/2006 | Sajassi | 370/400 |
| 2007/0097968 A1* | 5/2007 | Du | 370/389 |

FOREIGN PATENT DOCUMENTS

| | | |
|---|---|---|
| CN | 1538682 | 10/2004 |
| EP | 1 526 681 A1 | 4/2005 |
| WO | WO 2004/088932 | 10/2004 |

OTHER PUBLICATIONS

First Office Action of the State Intellectual Property Office of the PRC, issued in Chinese application No. 200510083968.6, Huawei Technologies Co., Ltd.

EP Communication pursuant to Article 93(3) EPC dated Oct. 21, 2008, issued in related application EP 06752932.1, Huawei Technologies Co., Ltd.

EP Communication pursuant to Article 94(3) EPC dated Jul. 7, 2009, issued in related application EP 06752932.1, Huawei Technologies Co., Ltd.

EP Communication pursuant to Article 94(3) EPC dated Mar. 29, 2010, issued in related application EP 06752932.1, Huawei Technologies Co., Ltd.

China Telecommunications Technical Specification of IP Metropolitan Area Network (V-Switch), Ver. 1.0, China Telecommunications Corporation, Jan. 2006.

Atsushi Iwata, et al; "Global Open Ethernet (GOE) System and its Performance Evaluation", IEEE Journal on Selected Areas in Communications, vol. 22, No. 8.Oct. 2004, pp. 1432-1442.

Jaihyung Cho; "Label Switched Ethernet Technology", Advanced Communication Technology, 2005, ICACT 2005. The t h International Conference on Phoenix Park, Korea Feb. 21-23, 2005, Piscataway, NJ, USA, IEEE, vol. 1, pp. 619-623, XP010813714.

Liu Junmin, et al; "Architecture, Function and Requirements for V-Switch", ITU-T Draft Study Period 2001-2004, International Telecommunication Union, Geneva, CH, Vol. Study Group 13, Feb. 3, 2004, pp. 1-3, XP017416712.

Maher Ali, et al; "Issues and Approaches on Extending Ethernet Beyond LANS", IEEE Communications Magazine, IEEE Service Center, Piscataway, US, vol. 42, No. 3, Mar. 1, 2004, pp. 80-86, XP0111 08916.

European Search Report dated Jun. 24, 2008; Application No./Patent No. 06752932.1-24161 1906595 PCT/CN2006001290.

* cited by examiner

METHOD AND DEVICE FOR IMPLEMENTING VIRTUAL-SWITCH

CROSS-REFERENCE TO RELATED APPLICATIONS

This application is a continuation of U.S. patent application Ser. No. 12/014,170, filed on Jan. 15, 2008 now U.S. Pat. No. 8,045,461, which is a continuation of International Application No. PCT/CN2006/001290, filed on Jun. 12, 2006. The International Application claims priority to Chinese Patent Application No. 200510083968.6, filed on Jul. 15, 2005. The afore-mentioned patent applications are hereby incorporated by reference in their entireties.

FIELD OF THE INVENTION

The present invention relates to the technical field of network communications, in particular, to a method and a device for implementing a Virtual-Switch (V-Switch).

BACKGROUND OF THE INVENTION

As the scale of Internet becomes larger, various network services spring up one after another, and advanced multimedia systems emerge in endlessly. Because real-time services are sensitive to the features of network, such as transmission delay and time delay jitter, when File Transfer Protocol (FTP) service with a high burst or Hyper Text Transport Protocol (HTTP) service having an image file occurs, the real-time service will be influenced greatly. Moreover, the multimedia service occupies substantial bandwidth, thus the key service to be guaranteed by the network may not be transmitted reliably. Therefore, various Quality of Service (QoS) technologies emerge as required. Internet Engineering Task Force (IETF) has proposed many service models and mechanisms to meet QoS requirements.

Various portal-based applications, services and broadband multimedia services have become important contents of broadband operators, including services provided to common residential users, such as Video/Audio streams, Video On Demand (VOD), Video Multicast, the multimedia interaction, network games requiring a high bandwidth and services provided to commercial users, such as the video conference, the remote education, Virtual Private Network (VPN), Data Private Line with guaranteed QoS, and Internet Protocol Hotel (IPHotel).

The Ethernet technology and the End-To-End Ethernet technology enjoy a high recognition among the Operators and enterprise users. The Ethernet technology has become one of the main technologies for implementing Triple Play and Metropolitan Area Network in the future. Therefore, the Ethernet service may have a cheerful prospect in the future market.

At present, various VPN or Virtual Private Dial-up Network (VPDN) private line solutions, such as V-Switch, Generic Routing Encapsulation (GRE), Layer 2 Tunneling Protocol (L2TP), Multiple Protocols Label Switch (MPLS), have been put forward for these commercial users.

The Intelligent V-Switch (IVS) technology is mainly used for constructing a stable, practical, economic, and carrier-level Metropolitan Area Ethernet. Therefore, telecommunication-level functions with guaranteed QoS and network security protection, such as network maintenance and management, may be implemented. Further, the IVS technology provides core service management capabilities, such as number-based user management, certain mobility, open service and centralized charging management, and the IVS technology also provides services such as intelligent layer 2 flow scheduling, Local Area Network (LAN) private line, and IP flow planning. The occurrence of IVS improve the pure layer-2 capability in current network and plays an important role in the construction of Metropolitan Area Networks in new era.

The V-Switch architecture has a Ethernet VLAN switching and scheduling function, flexible measures for scheduling, setting up and adjusting services, an abundant and extensible layer-2 service provision capability, and Operation, Administration And Maintenance (OAM) tools and information. The logic layers and function model of the V-Switch system are as shown in FIG. 1.

In FIG. 1, the V-Switch system is divided into three layers: V-Switch service control layer, V-Switch connection control layer and V-Switch bearer layer.

The V-Switch connection control layer maintains switching resources in a Data Retransmission Entity (DRE), such as equipment, ports, links and VLAN tags, receives a V-Switch setup request from a Service Control Register (SCR) of the service layer V-Switch, selects a traffic flow path for the V-Switch connection, allocates a bandwidth and Virtual Local Area Network (VLAN) tags, and transmits the control information to the DRE equipment through which the traffic flow passes.

The DRE lies in the V-Switch bearer layer. The DRE forwards the traffic flow in Ethernet frame format according to a VLAN switching table configured by the V-Switch connection control layer.

The contents of the VLAN switching table are as shown in Table 1.

TABLE 1

| | Parameter | Parameter Description |
|---|---|---|
| | port 1 | Traffic flow forwarding port 1, such as GE 1/0/0 |
| | vlan id 1 | VLAN ID carried in traffic flow on Port 1 in the Ethernet frame format |
| | port 2 | Traffic flow forwarding port 2, such as GE 1/0/1 |
| | vlan id 2 | VLAN ID carried in traffic flow on Port 2 in the Ethernet frame format |
| | Bandwidth | Bandwidth limitation for traffic flow |
| .1 | Upstream Maximum Bandwidth | Maximum bandwidth of upstream traffic flow (received at port 1, and sent from port 2) |
| .2 | Downstream Maximum Bandwidth | Maximum bandwidth of downstream traffic flow (received at port 2, and sent from port 1) |
| | QoS Parameter | QoS parameter requirement for traffic flow |
| .1 | Delay | |
| .2 | Delay Jitter | |
| .3 | Packet Loss Ratio | |

The traffic flow is forwarded by the DRE based on the VLAN switching table. The process in which the DRE forwards the traffic flow data according to the VLAN switching table is implemented as follows.

When an Ethernet frame of vlan id 1 received at port 1 is sent to port 2, vlan id 1 is swapped into vlan id 2. When an Ethernet frame of vlan id 2 received at port 2 is sent to port 1, vlan id 2 is swapped into vlan id 1.

Through the above forwarding, a VLAN virtual channel may be set up in the network. The virtual channel may be described as: (equipment 1, port 1, vlan id 1)-(equipment 1, port 2, vlan id 2)-(equipment 2, port 3, vlan id 2)-(equipment 2, port 1, vlan id 3) . . . .

The conventional Ethernet switch can only support the transparent transmission of 4096 VLAN tags globally. The V-Switch technology implements the switching between different VLAN IDs and localizes the VLAN ID, so that the VLAN ID has a local meaning.

Although the method for implementing the switching between different VLAN IDs according to a current V-Switch technology can alleviate the problem of insufficient VLAN tag resources, the problem of insufficient VLAN tag resources cannot be solved completely. The number of VLAN tags on each local link is still limited to 4096, and the number of V-Switch connections carried on each local link cannot be larger than 4096. Therefore, the application scale of V-Switch technology is limited.

SUMMARY OF THE INVENTION

An object of the present invention is to provide a method and a device for implementing a V-Switch, so that the number of V-Switch connections carried on each local link can break through the limitation by using at least two VLAN tags. Hence, the switching capability of the V-Switch technology may be improved, and the application scale of V-Switch technology may be enlarged.

The invention provides a method for implementing a V-Switch, includes: setting up a V-Switch correlation with respect to at least two VLAN tags; and performing, by a DRE, a V-Switch transmission on a data frame received according to the V-Switch correlation.

The at least two VLAN tags include an outer VLAN tag and an inner VLAN tag, and the inner VLAN tag has at least one VLAN tag.

Setting up the V-Switch correlation includes:
setting up a correlation with respect to a first port, a first port VLAN tag and a second port, a second port outer VLAN tag, a second port inner VLAN tag.

The method further includes:
performing, by the DRE, a QinQ (VLAN Stack) encapsulation on an Ethernet frame encapsulated with VLAN protocol of the first port VLAN tag received from the first port according to the second port inner VLAN tag and the second port outer VLAN tag in the correlation, and transmitting an encapsulated Ethernet frame via the second port; and performing, by the DRE, a VLAN protocol encapsulation on an Ethernet frame encapsulated with QinQ of the second port inner VLAN tag and the second port outer VLAN tag received from the second port according to the first port VLAN tag in the correlation, and transmitting an encapsulated Ethernet frame via the first port The method further includes:
setting up a correlation with respect to a first port, a first port outer VLAN tag, a first port inner VLAN tag and a second port, a second port outer VLAN tag, a second port inner VLAN tag.

The method further includes:
performing, by the DRE, a QinQ encapsulation on an Ethernet frame encapsulated with QinQ of the first port outer VLAN tag and the first port inner VLAN tag received from the first port according to the second port inner VLAN tag and the second port outer VLAN tag in the correlation, and transmitting an encapsulated Ethernet frame via the second port; and performing, by the DRE, the QinQ encapsulation on an Ethernet frame encapsulated with QinQ of the second port inner VLAN tag and the second port outer VLAN tag received from the second port according to the first port inner VLAN tag and the first port outer VLAN tag in the correlation, and transmitting an encapsulated Ethernet frame via the first port.

The correlation is set in a VLAN switching table.

The method further includes:
adding an inner VLAN tag field to the VLAN switching table;
when an inner VLAN tag corresponding to one port in one record of the VLAN switching table includes an invalid VLAN ID and an inner VLAN tag corresponding to the other port includes a valid VLAN ID, storing the correlation with respect to the first port, the first port outer VLAN tag and the second port, the second port outer VLAN tag, the second port inner VLAN tag in the record;
when the inner VLAN tags corresponding to two ports in one record of the VLAN switching table are both valid VLAN IDs, storing the correlation with respect to the first port, the first port outer VLAN tag, the first port inner VLAN tag and the second port, the second port outer VLAN tag, the second port inner VLAN tag in the record; and
when the inner VLAN tags corresponding to two ports in one record of the VLAN switching table are both invalid VLAN IDs, storing the correlation with respect to the first port, the first port outer VLAN tag and the second port, the second port outer VLAN tag in the record.

The method further includes:
adding a switching mode type field and an inner VLAN tag field to the VLAN switching table;
when a switching mode type in one record of the VLAN switching table is a first predetermined value, storing the correlation with respect to the first port, the first port outer VLAN tag and the second port, the second port outer VLAN tag, the second port inner VLAN tag in the record;
when the switching mode type in one record of the VLAN switching table is a second predetermined value, storing the correlation with respect to the first port, the first port outer VLAN tag, the first port inner VLAN tag and the second port, the second port outer VLAN tag and the second port inner VLAN tag in the record; and
when the switching mode type in one record of the VLAN switching table is a third predetermined value, storing the correlation with respect to the first port, the first port outer VLAN tag and the second port, the second port outer VLAN tag in the record.

The invention further provides a device for implementing a V-Switch, including:
a storage module, adapted to store a V-Switch correlation with respect to at least two VLAN tags; and
a forwarding module, adapted to transmit an Ethernet frame received according to the V-Switch correlation stored in the storage module.

It can be seen from the above descriptions, through setting up a V-Switch correlation with respect to at least two VLAN tags, the DRE can implement a new V-Switch transmission for an Ethernet frame according to the correlation. For example, the V-Switch transmission for an Ethernet frame encapsulated with VLAN and an Ethernet frame encapsulated with QinQ is implemented, and the V-Switch transmission for an Ethernet frame encapsulated with QinQ and another Ethernet frame encapsulated with QinQ is implemented, thus it is avoided that the number of local VLAN tags is limited to 4096. When the two VLAN tags are used, the number of V-Switch connections carried on a local link is extended to 4096×4096, and when three- or more-layer VLAN tags are used, the number of V-Switch connections carried on a local link is extended to 4096×4096×4096 . . . . Thus, the problem of insufficient VLAN tag resources is effectively solved, and the requirement for the application scale of the V-Switch technology is met. The invention implements the V-Switch method, and the switching capability of the V-Switch technology is improved, and the application scale of the V-Switch technology is enlarged.

DETAILED DESCRIPTION OF THE EMBODIMENTS

Figure 1:
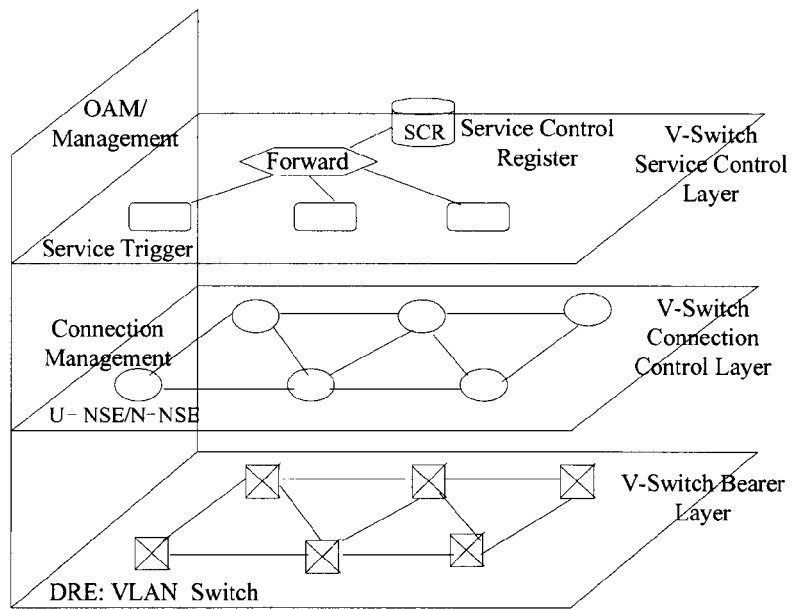
FIG. 1 is a schematic diagram of the logic layers and function models of a V-Switch system.

The invention provides a method and a device for implementing a V-Switch. According to the invention, a V-Switch correlation with respect to at least two VLAN tags is set up, a DRE can perform a V-Switch transmission on a received Ethernet frame according to the V-Switch correlation with respect to the at least two VLAN tags.

To make the principles, features and advantages of the invention more apparent, the embodiments of the invention will now be further described by taking two specific methods for V-Switch as examples.

Embodiment 1

In the method for implementing the V-Switch according to the first embodiment of the invention, only one side in the correlation includes at least two VLAN tags.

First of all, a correlation with respect to Port1, Port1 VLAN tag vlan1 and Port2, Port2 outer VLAN tag Ovlan2, Port2 inner VLAN tag Ivlan2, is set up. Thus, when a DRE receives an Ethernet frame encapsulated with one VLAN tag vlan1 from Port1, the DRE converts the Ethernet frame into an Ethernet frame encapsulated with Ovlan2 and Ivlan2, then the DRE forwards the frame encapsulated with Ovlan2 as the outer VLAN tag and Ivlan2 as the inner VLAN tag through Port2. When the DRE receives the Ethernet frame encapsulated with Ovlan2 as the outer VLAN tag and Ivlan2 as the inner VLAN tag from Port2, the DRE converts the Ethernet frame into an Ethernet frame encapsulated with vlant then forwards the frame encapsulated with vlan1 through Port1. In this embodiment, in order to solve the problem that the number of local VLAN tags is limited to 4096, the number of V-Switch connections carried on each local link may be extended to 4096×4096 through the two VLAN tags. When the inner VLAN tag includes three- or more-VLAN tags, the invention can extend the number of V-Switch connections carried on each local link to 4096×4096×4096 . . . . Thus, the number of V-Switch connections carried on each link may be extended greatly, the problem of insufficient VLAN tag resources can be effectively solved, and the requirements for the application scale of the V-Switch technology can be met.

Embodiment 2

In the method for implementing the V-Switch according to the second embodiment of the invention, both sides in the correlation include at least two VLAN tags.

First of all, a correlation with respect to Port1, Port1 Outer VLAN tag Ovlan1, Port1 Inner VLAN tag Ivlan1 and Port2, Port2 Outer VLAN tag Ovlan2, Port2 Inner VLAN tag Ivlan2, is set up. Thus, when a DRE receives an Ethernet frame encapsulated with Ovlan1 and Ivlan1 from Port1, the DRE converts the Ethernet frame into an Ethernet frame encapsulated with Ovlan2 and Ivlan2, and then forwards the Ethernet frame encapsulated with Ovlan2 and Ivlan2. When the DRE receives the Ethernet frame encapsulated with Ovlan2 and Ivlan2 from Port2, the DRE converts frame encapsulated with the Ovlan2 and Ivlan2 in a frame with encapsulated Ovlan1 and Ivlan1, and then forwards the Ethernet frame encapsulated with Ovlan1 and Ivlan1 to Port 1. Similarly, this embodiment also solves the problem that the number of local VLAN tags is limited to 4096, and the number of V-Switch connections carried on each local link may be extended to 4096×4096 by the two VLAN tags. When the number of inner VLAN tags is three or more, the invention can extend the number of V-Switch connections carried on each local link to 4096×4096×4096 . . . . Thus, the number of V-Switch connections carried on each link may be extended greatly, the problem of insufficient VLAN tag resources can be effectively solved, and the requirements for the application scale of the V-Switch technology can be met.

The V-Switch correlation with respect to at least two VLAN tags in the above Embodiments may be implemented by extending the VLAN tag switching table in the DRE.

When the inner VLAN tag only includes one inner VLAN tag, the extended VLAN tag switching table is as shown in Table 2.

TABLE 2

| | Parameter | Parameter Description |
|---|---|---|
| 1 | port 1 | Traffic flow forwarding port 1, such as GE 1/0/0 |
| 2 | vlan id 1 | The VLAN ID carried in Ethernet frame of traffic flow on Port 1 |
| 2.1 (extension) | vlan id 1' | An invalid or illegal value of vlan id 1' indicates a common 802.1Q encapsulation with only one VLAN Tag encapsulated; and a valid value indicates a QinQ encapsulation, and the valid value is the inner VLAN (vlan id 1 is the outer VLAN) |
| 3 | port 2 | Traffic flow forwarding port 2, such as GE 1/0/1 |
| 4 | vlan id 2 | The VLAN ID encapsulated in Ethernet frame of traffic flow on Port 2 |
| 4.1 (extension) | vlan id 2' | An invalid or illegal value of vlan id 2' indicates a common 802.1Q encapsulation with only one VLAN Tag encapsulated; and a valid value indicates a QinQ encapsulation, and the valid value is the inner VLAN (vlan id 2 is the outer VLAN) |
| 5 | Bandwidth | Bandwidth limitation of traffic flow |
| 5.1 | Upstream Maximum Bandwidth | The maximum bandwidth of upstream traffic flow (received from port 1, and sent through port 2) |
| 5.2 | Downstream Maximum Bandwidth | The maximum bandwidth of downstream traffic flow (received from port 2, and sent through port 1) |
| 6 | QoS Parameter | QoS parameter requirement for traffic flow |
| 6.1 | Delay | |
| 6.2 | Delay Jitter | |
| 6.3 | Packet Loss Ratio | |

In Table 2, when vlan id 1' corresponding to port 1 is an invalid VLAN ID and vlan id 2' corresponding to Port2 is a valid VLAN ID, or when vlan id 1' corresponding to port 1 is a valid VLAN ID and vlan id 2' corresponding to Port2 is an invalid VLAN ID, or when vlan id 1' corresponding to port 1 is a valid VLAN ID and vlan id 2' corresponding to Port2 is also a valid VLAN ID, it is indicated that the DRE needs to perform the V-Switch transmission of the invention on an Ethernet frame received according to the table item.

When vlan id 1' corresponding to port 1 is an invalid VLAN ID and vlan id 2' corresponding to Port2 is an invalid VLAN ID, it is indicated that the DRE needs to perform "Port+VLAN" V-Switch transmission in the prior art on a received Ethernet frame according to the table item.

The two methods for implementing the V-Switch according to the invention may be implemented by the VLAN Stack technology.

The VLAN Stack technology is also referred to as QinQ (VLAN Stack), which is a picturesque name of the tunneling protocol based on encapsulation of 802.1Q. The core concept lies in that: the inner VLAN tag of the user is encapsulated with the outer VLAN tag, and a packet carrying the two tags passes through the backbone network of the service provider, and the outer VLAN tag is deleted when the packet exits the network of the service provider. Therefore, a simple layer 2 VPN tunneling may be provided to the user.

When the correlation in the invention is set according to Table 2, the DRE implements the V-Switch transmission using the VLAN Stack technology as follows.

After the DRE receives a packet from port 1, the DRE first needs to determine the items in the VLAN switching table corresponding to the packet; then, the DRE determines whether the values of vlan id V and vlan id 2' in the table are valid.

If vlan id 1' in the table is valid and vlan id 2' is invalid, the packet received by the DRE will be an Ethernet frame encapsulated with the QinQ, in other words, the packet received by the DRE is an Ethernet frame encapsulated with the QinQ and having an outer VLAN tag of vlan id 1 and an inner VLAN tag of vlan id 1'. The DRE needs to convert the Ethernet frame encapsulated with vlan id 1 and vlan id 1' into an Ethernet frame encapsulated with vlan id 2, and send the Ethernet frame encapsulated with vlan id 2 via Port2, so that the V-Switch transmission may be implemented between an Ethernet frame encapsulated with QinQ and an Ethernet frame encapsulated with 802.1Q.

If vlan id 2' in the table is valid and vlan id 1' is invalid, the packet received by the DRE will be an Ethernet frame encapsulated with 802.1Q and having a vlan tag of vlan id 1, and the DRE needs to convert the Ethernet frame encapsulated with vlan id 1 into an Ethernet frame encapsulated with vlan id 2 and vlan id 2', in other words, the Ethernet frame is encapsulated with QinQ and has an outer VLAN tag of vlan id 2 and an inner VLAN tag of vlan id 2'. The DRE sends the converted Ethernet frame via Port2, so that the V-Switch transmission can be implemented between an Ethernet frame encapsulated with 802.1Q and an Ethernet frame encapsulated with QinQ.

If vlan id 1' and vlan id 2' in the table are both valid, the packet received by the DRE is an Ethernet frame encapsulated with QinQ and having vlan tags of vlan id 1 and vlan id 1', in other words, the Ethernet frame is encapsulated with QinQ and has an outer VLAN of vlan id 1 and an inner VLAN of vlan id 1', and the DRE needs to convert the Ethernet frame encapsulated with vlan id 1 and vlan id 1' into an Ethernet frame encapsulated with an outer VLAN of vlan id 2 and an inner VLAN of vlan id 2', and send the converted Ethernet frame via Port2, so that the V-Switch transmission is implemented between an Ethernet frame encapsulated with QinQ and an Ethernet frame encapsulated with QinQ.

If vlan id 1' and vlan id 2' in the table are both invalid, the packet received by the DRE will be an Ethernet frame encapsulated with 802.1Q and having a Vlan tag of vlan id 1, and the DRE needs to implement the V-Switch transmission for the packet according to "Port+VLAN" V-Switch method in the prior art.

The invention may implement the correlation by other method for expanding the VLAN switching table. For example, in addition to the field vlan id 1' and the field vlan id 2', a switching mode type field may be added to the VLAN switching table. The VLAN switching mode employed by the DRE may be indicated according to different values of the switching mode type field. For example, when the value of the switching mode type field is a first predetermined value, the DRE can perform the V-Switch transmission on a packet with the V-switch method in which only one side in the correlation includes the inner VLAN tag. When the value of the switching mode type field is a second predetermined value, the DRE may perform the V-switch transmission on a packet with the V-switch method in which both sides in the correlation include an inner VLAN tag. When the value of the switching mode type filed is the third predetermined value, the DRE may perform the V-switch transmission on a packet with the "Port+VLAN" V-switch method in the prior art.

Figure 2:
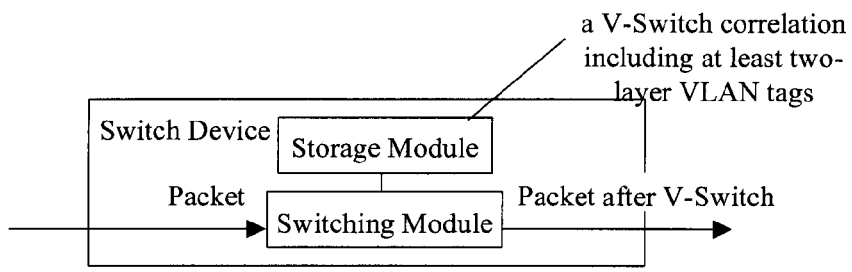
FIG. 2 is a schematic diagram of a V-Switch device according to one embodiment of the invention.

The V-Switch device according to the invention is as shown in FIG. 2.

In FIG. 2, the V-Switch device includes a storage module and a switching module.

The storage module is adapted to store a V-Switch correlation. Here, the V-Switch correlation includes: a V-Switch correlation with respect to at least two VLAN tags and a correlation with respect to Port1, Port1 VLAN tag 1 and Port2, Port2 VLAN tag 2. The V-Switch correlation with respect to at least two VLAN tags includes: a correlation with respect to Port1, Port1 VLAN tag 1 and Port2, Port2 outer VLAN tag 2, Port2 inner VLAN tag 2; and a correlation with respect to Port1, Port1 outer VLAN tag 1, Port1 inner VLAN tag 1 and Port2, Port2 outer VLAN tag 2, Port2 inner VLAN tag 2. These correlations may be stored in the form of a VLAN switching table.

The switching module is adapted to receive an Ethernet frame, determine an item in the VLAN switching table corresponding to the Ethernet frame and determine the switching mode for the Ethernet frame according to the contents in the item, and then send the packet according to the switching mode for the Ethernet frame. For example, the V-Switch transmission is performed with the method for the V-Switch in which only one side in the correlation includes at least two VLAN tags, or the V-Switch transmission is performed with the method for the V-Switch in which both sides in the correlation include at least two VLAN tags, or the V-Switch transmission is performed with "Port+VLAN" method in the prior art. The method of the switching module to perform the V-Switch transmission on the packet is similar to that in the above descriptions, and repeat descriptions thereof are omitted.

The device for implementing the V-Switch according to the invention includes an intermediate DRE in a V-Switch domain.

Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

The invention claimed is:

1. A method for implementing a virtual switch (V-Switch) data transmission, comprising:

receiving, by a data retransmission entity (DRE), a data frame via a first port for transmission via a second port, wherein the data frame is encapsulated with at least one first port virtual local area network (VLAN) tag;

converting the data frame so that it is encapsulated with at least two second port VLAN tags according to a V-Switch correlation between the at least one first port VLAN tag and the at least two second port VLAN tags set forth in a VLAN switching table; wherein the at least two second port VLAN tags comprise an outer VLAN tag and an inner VLAN tag, and the inner VLAN tag comprises at least one layer of VLAN tag; and transmitting, by the DRE, the converted data frame via the second port;
wherein the data frame received via the first port is a VLAN protocol encapsulated Ethernet frame, and wherein converting the data frame so that it is encapsulated with at least two second port VLAN tags comprises:
performing, by the DRE, a VLAN stack (QinQ) encapsulation on the VLAN protocol encapsulated Ethernet frame according to the V-Switch correlation between the at least one first port VLAN tag and the second port inner and outer VLAN tags set forth in the VLAN switching table.

2. A method for implementing a virtual switch (V-Switch) data transmission, comprising:
receiving, by a data retransmission entity (DRE), a data frame via a first port for transmission via a second port, wherein the data frame is encapsulated with at least one first port virtual local area network (VLAN) tag;
converting the data frame so that it is encapsulated with at least two second port VLAN tags according to a V-Switch correlation between the at least one first port VLAN tag and the at least two second port VLAN tags set forth in a VLAN switching table; wherein the at least two second port VLAN tags comprise an outer VLAN tag and an inner VLAN tag, the inner VLAN tag comprises at least one layer of VLAN tag, the at least one first port VLAN tag comprises a first port outer VLAN tag and a first port inner VLAN tag, and the V-switch correlation set forth in the VLAN switching table is a correlation between the first port outer and inner VLAN tags and the second port outer and inner VLAN tags; and
transmitting, by the DRE, the converted data frame via the second port.

3. The method according to claim 2, wherein the data frame received via the first port is a VLAN protocol encapsulated Ethernet frame encapsulated with QinQ of the first port outer VLAN tag and the first port inner VLAN tag, and wherein converting the data frame so that it is encapsulated with at least two second port VLAN tags comprises:
performing, by the DRE, a QinQ encapsulation on the VLAN protocol encapsulated Ethernet frame according to the V-Switch correlation between the first port outer and inner VLAN tags and the second port outer and inner VLAN tags set forth in the VLAN switching table.

4. The method according to claim 2, wherein the VLAN switching table comprises the following fields: identifier of the first port, first port outer VLAN tag, first port inner VLAN tag, identifier of the second port, second port outer VLAN tag, and second port inner VLAN tag;
when the first port inner VLAN tag field has an invalid value and the second port inner VLAN tag field has a valid value, information stored in the VLAN switching table sets forth a correlation between the first port outer VLAN tag and the second port outer and inner VLAN tags;
when both the first port inner VLAN tag field and the second port inner VLAN tag field have valid values, information stored in the VLAN switching table sets forth a correlation between the first port outer and inner VLAN tags and the second port outer and inner VLAN tags; and
when both the first port inner VLAN tag field and the second port inner VLAN tag field have invalid values, information stored in the VLAN switching table sets forth a correlation between the first port outer VLAN tag and the second port outer VLAN tag.

5. The method according to claim 4, wherein the VLAN switching table further comprises a switching mode type field;
when the switching mode type field has a first value, information stored in the VLAN switching table sets forth a correlation between the first port outer VLAN tag and the second port outer and inner VLAN tags;
when the switching mode type field has a second value, information stored in the VLAN switching table sets forth a correlation between the first port outer and inner VLAN tags and the second port outer and inner VLAN tags; and
when the switching mode type field has a third value, information stored in the VLAN switching table sets forth a correlation between the first port outer VLAN tag and the second port outer VLAN tag.

6. The method according to claim 5, wherein converting the data frame so that it is encapsulated with at least two second port VLAN tags comprises:
when the switching mode type field has the first value, converting, by the DRE, a VLAN protocol encapsulated Ethernet frame having the first port outer VLAN tag and received via the first port to an encapsulated Ethernet frame which is encapsulated with QinQ of the second port inner VLAN tag and the second port outer VLAN tag,
when the switching mode type field has the second value, converting, by the DRE, an encapsulated Ethernet frame which is encapsulated with QinQ of the first port outer VLAN tag and the first port inner VLAN tag and received via the first port to an encapsulated Ethernet frame which is encapsulated with QinQ of the second port inner VLAN tag and the second port outer VLAN tag,
when the switching mode type field has the third value, converting, by the DRE, a VLAN protocol encapsulated Ethernet frame having the first port outer VLAN tag to an encapsulated Ethernet frame which is encapsulated with QinQ of the second port outer VLAN tag.

7. The method according to claim 2, wherein converting the data frame so that it is encapsulated with at least two second port VLAN tags comprises:
converting, by the DRE, a first encapsulated Ethernet frame to a second encapsulated Ethernet frame according to the V-Switch correlation set forth in the VLAN switching table, wherein the first encapsulated Ethernet frame is encapsulated with QinQ of the first port outer VLAN tag and the first port inner VLAN tag and received via the first port, and the second encapsulated Ethernet frame is encapsulated with QinQ of the second port inner VLAN tag and the second port outer VLAN tag.

8. The method according to claim 2, wherein the VLAN switching table comprises a first port inner VLAN tag field and a second port inner VLAN tag field; and wherein when the first port inner VLAN tag field has an invalid value and the second port inner VLAN tag field has a valid value, converting the data frame so that it is encapsulated with at least two second port VLAN tags comprises:
converting, by the DRE, a VLAN protocol encapsulated Ethernet frame having at least one first port VLAN tag and received via the first port to an encapsulated Ethernet frame which is encapsulated with QinQ of the second port inner VLAN tag and the second port outer VLAN tag according to the V-Switch correlation set forth in the VLAN switching table.

9. The method according to claim 2, wherein the VLAN switching table comprises a first port inner VLAN tag field and a second port inner VLAN tag field; and wherein when both the first port inner VLAN tag field and the second port inner VLAN tag field have invalid values, converting the data frame so that it is encapsulated with at least two second port VLAN tags comprises:

converting, by the DRE, an encapsulated Ethernet frame which is encapsulated with QinQ of a first port outer VLAN tag and a first port inner VLAN tag and received via the first port to an encapsulated Ethernet frame which is encapsulated with QinQ of a second port inner VLAN tag and a second port outer VLAN tag according to the V-Switch correlation set forth in the VLAN switching table.

10. A device for implementing a virtual switch (V-Switch) data transmission, comprising:

a storage unit, configured to store a virtual local area network (VLAN) switching table;

a receiving unit, configured to receive a data frame via a first port for transmission via a second port, wherein the data frame is encapsulated with at least one first port VLAN tag;

a converting unit, configured to convert the data frame so that it is encapsulated with at least two second port VLAN tags according to a V-Switch correlation between the at least one first port VLAN tag and the at least two second port VLAN tags set forth in the VLAN switching table; wherein the at least two second port VLAN tags comprise an outer VLAN tag and an inner VLAN tag, and the inner VLAN tag comprises at least one layer of VLAN tag; and a transmitting unit, configured to transmit the converted data frame via the second port;

wherein the data frame received via the first port is a VLAN protocol encapsulated Ethernet frame having the at least one first port VLAN tag, and the converting unit is configured to:

convert the VLAN protocol encapsulated Ethernet frame to an encapsulated Ethernet frame which is encapsulated with QinQ of the second port inner VLAN tag and the second port outer VLAN tag according to the correlation set forth in the VLAN switching table.

11. A device for implementing a virtual switch (V-Switch) data transmission, comprising:

a storage unit, configured to store a virtual local area network (VLAN) switching table;

a receiving unit, configured to receive a data frame via a first port for transmission via a second port, wherein the data frame is encapsulated with at least one first port VLAN tag;

a converting unit, configured to convert the data frame so that it is encapsulated with at least two second port VLAN tags according to a V-Switch correlation between the at least one first port VLAN tag and the at least two second port VLAN tags set forth in the VLAN switching table; wherein the at least two second port VLAN tags comprise an outer VLAN tag and an inner VLAN tag, the inner VLAN tag comprises at least one layer of VLAN tag, the at least one first port VLAN tag comprises a first port outer VLAN tag and a first port inner VLAN tag, and the V-switch correlation set forth in the VLAN switching table is a correlation between the first port outer and inner VLAN tags and the second port outer and inner VLAN tags; and a transmitting unit, configured to transmit the converted data frame via the second port.

12. The device according to claim 11, wherein the data frame received via the first port is a VLAN protocol encapsulated Ethernet frame having the first port outer VLAN tag and the first port inner VLAN tag, and the converting unit is configured to:

convert the encapsulated Ethernet frame which is encapsulated with QinQ of the first port outer VLAN tag and the first port inner VLAN tag to an encapsulated Ethernet frame which is encapsulated with QinQ of the second port inner VLAN tag and the second port outer VLAN tag according to the V-Switch correlation set forth in the VLAN switching table.

13. The device according to claim 11, wherein the VLAN switching table comprises the following fields: identifier of the first port, first port outer VLAN tag, first port inner VLAN tag, identifier of the second port, second port outer VLAN tag, and second port inner VLAN tag;

when the first port inner VLAN tag field has an invalid value and the second port inner VLAN tag field has a valid value, information stored in the VLAN switching table sets forth a correlation between the first port outer VLAN tag and the second port outer and inner VLAN tags;

when both the first port inner VLAN tag field and the second port inner VLAN tag field have valid values, information stored in the VLAN switching table sets forth a correlation between the first port outer and inner VLAN tags and the second port outer and inner VLAN tags; and when both the first port inner VLAN tag field and the second port inner VLAN tag field have invalid values, information stored in the VLAN switching table sets forth a correlation between the first port outer VLAN tag and the second port outer VLAN tag.

14. The device according to claim 13, wherein the VLAN switching table further comprises a switching mode type field;

when the switching mode type field has a first value, information stored in the VLAN switching table sets forth a correlation between the first port outer VLAN tag and the second port outer and inner VLAN tags;

when the switching mode type field has a second value, information stored in the VLAN switching table sets forth a correlation between the first port outer and inner VLAN tags and the second port outer and inner VLAN tags; and when the switching mode type field has a third value, information stored in the VLAN switching table sets forth a correlation between the first port outer VLAN tag and the second port outer VLAN tag.

* * * * *